(12) United States Patent
Delehouze et al.

(10) Patent No.: US 11,958,784 B2
(45) Date of Patent: Apr. 16, 2024

(54) METHOD FOR MANUFACTURING A CERAMIC MATRIX COMPOSITE PART

(71) Applicant: SAFRAN CERAMICS, Le Haillan (FR)

(72) Inventors: Arnaud Delehouze, Moissy-Cramayel (FR); Eric Bouillon, Moissy-Cramayel (FR); Gildas Garnier, Moissy-Cramayel (FR); Clément Marie Benoit Roussille, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/257,029

(22) PCT Filed: Dec. 8, 2021

(86) PCT No.: PCT/FR2021/052236
§ 371 (c)(1),
(2) Date: Jun. 12, 2023

(87) PCT Pub. No.: WO2022/129733
PCT Pub. Date: Jun. 23, 2022

(65) Prior Publication Data
US 2023/0399265 A1 Dec. 14, 2023

(30) Foreign Application Priority Data
Dec. 18, 2020 (FR) ........................................ 2013613

(51) Int. Cl.
*C04B 35/657* (2006.01)
*C04B 35/628* (2006.01)
(Continued)

(52) U.S. Cl.
CPC ...... *C04B 35/657* (2013.01); *C04B 35/62844* (2013.01); *C04B 35/80* (2013.01);
(Continued)

(58) Field of Classification Search
CPC ............................. C04B 35/657; F01D 5/282
See application file for complete search history.

(56) References Cited

U.S. PATENT DOCUMENTS

2016/0177745 A1   6/2016  Uskert et al.
2016/0243777 A1*  8/2016  Marchal ............. B29D 99/0025
(Continued)

FOREIGN PATENT DOCUMENTS

EP    2 349 688 B1    9/2014
EP    2585281 B1 *    5/2019  ............. B29B 11/16
(Continued)

OTHER PUBLICATIONS

EP2585281, machine translation. (Year: 2019).*
(Continued)

*Primary Examiner* — Robert A Vetere
(74) *Attorney, Agent, or Firm* — Pillsbury Winthrop Shaw Pittman LLP

(57) ABSTRACT

A method for manufacturing a turbomachine blade made of ceramic matrix composite component includes at least a structural part and a functional part secured to the structural part, the method including obtaining an assembly including a first preform of the functional part that is mounted on a second preform of the structural part or on the structural part, the first preform including a fibrous reinforcement of short fibres, and the second preform or the structural part comprising a woven fibrous reinforcement, and densification of the first preform of the assembly by infiltration with a molten composition.

11 Claims, 2 Drawing Sheets

(51) Int. Cl.
    *C04B 35/80* (2006.01)
    *F01D 5/28* (2006.01)
(52) U.S. Cl.
    CPC ...... *F01D 5/282* (2013.01); *C04B 2235/5256* (2013.01); *C04B 2235/616* (2013.01); *F05D 2230/22* (2013.01); *F05D 2300/6033* (2013.01)

(56) References Cited

U.S. PATENT DOCUMENTS

| | | |
|---|---|---|
| 2017/0129207 A1 | 5/2017 | Hallander et al. |
| 2017/0369382 A1* | 12/2017 | Billotte Cabre .. C04B 35/62886 |
| 2018/0036914 A1* | 2/2018 | Marsal ................... B29C 70/24 |
| 2019/0224938 A1 | 7/2019 | Feie et al. |
| 2019/0323363 A1 | 10/2019 | Sippel et al. |
| 2019/0360345 A1* | 11/2019 | De Gaillard ............ B64C 11/26 |
| 2019/0376389 A1 | 12/2019 | Roberts et al. |

FOREIGN PATENT DOCUMENTS

| | | |
|---|---|---|
| FR | 2 961 845 A1 | 12/2011 |
| JP | 2020-509957 A | 4/2020 |
| WO | WO 2019/122760 A1 | 6/2019 |
| WO | WO 2019/129950 A1 | 7/2019 |
| WO | WO 2020/025878 A1 | 2/2020 |

OTHER PUBLICATIONS

International Search Report as issued in International Patent Application No. PCT/FR2021/052236, dated Apr. 5, 2022.
Written Opinion of the International Searching Authority as issued in International Patent Application No. PCT/FR2021/052236, dated Apr. 5, 2022.

* cited by examiner

[Fig. 1]
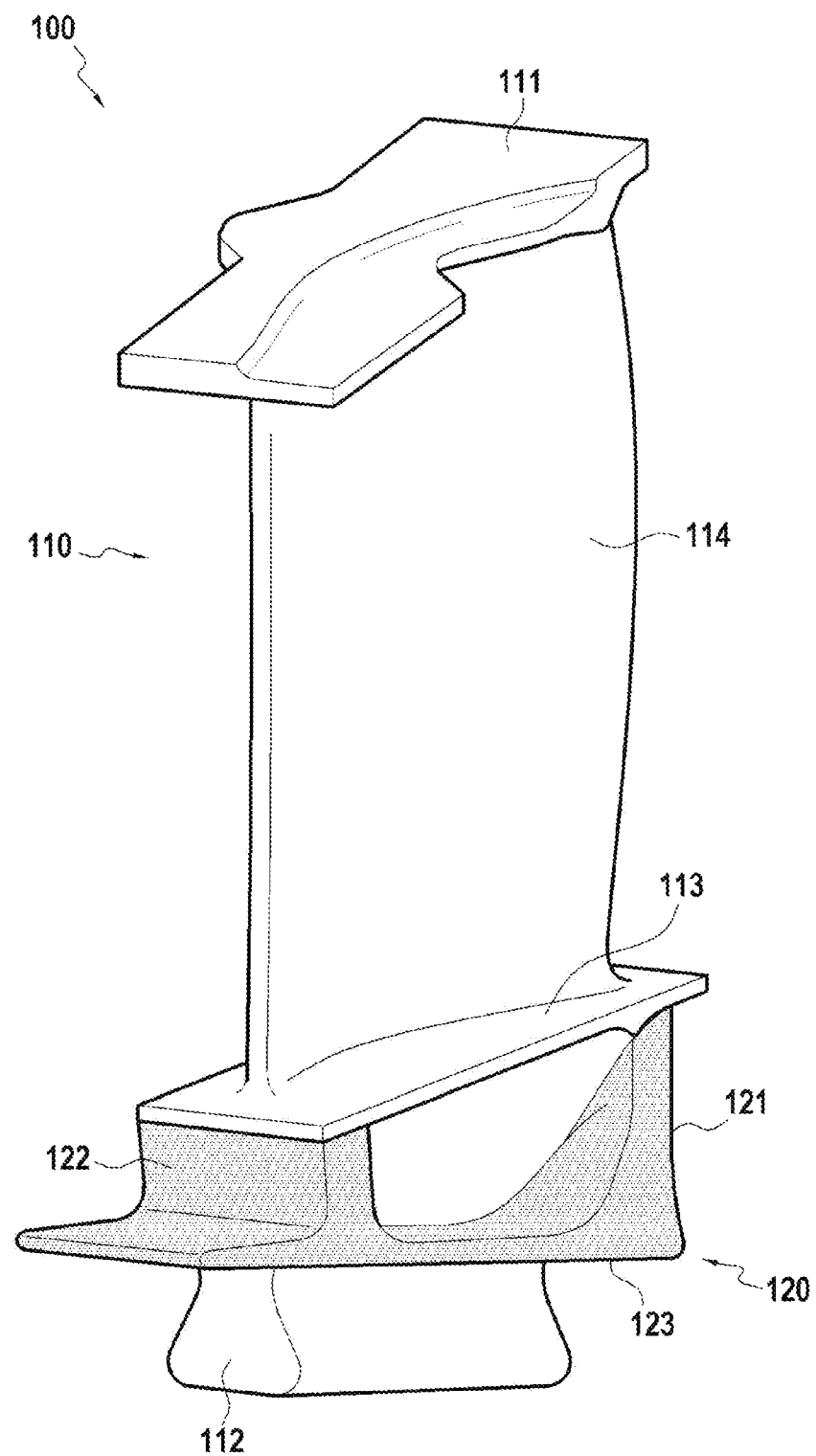

[Fig. 2]
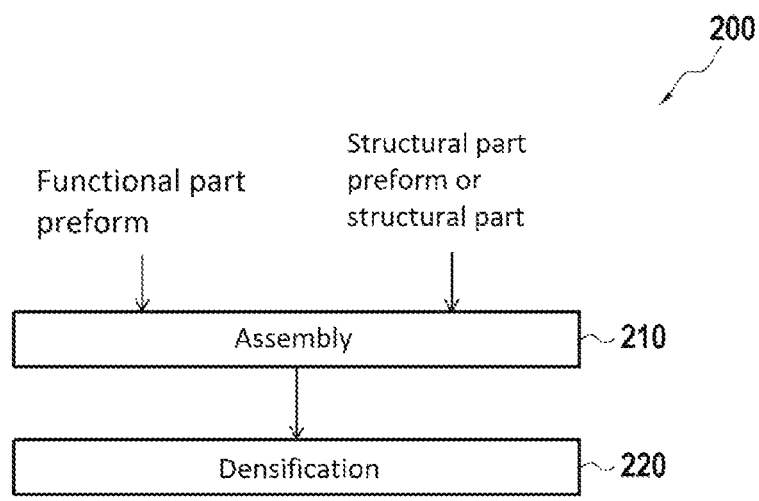
[Fig. 3]
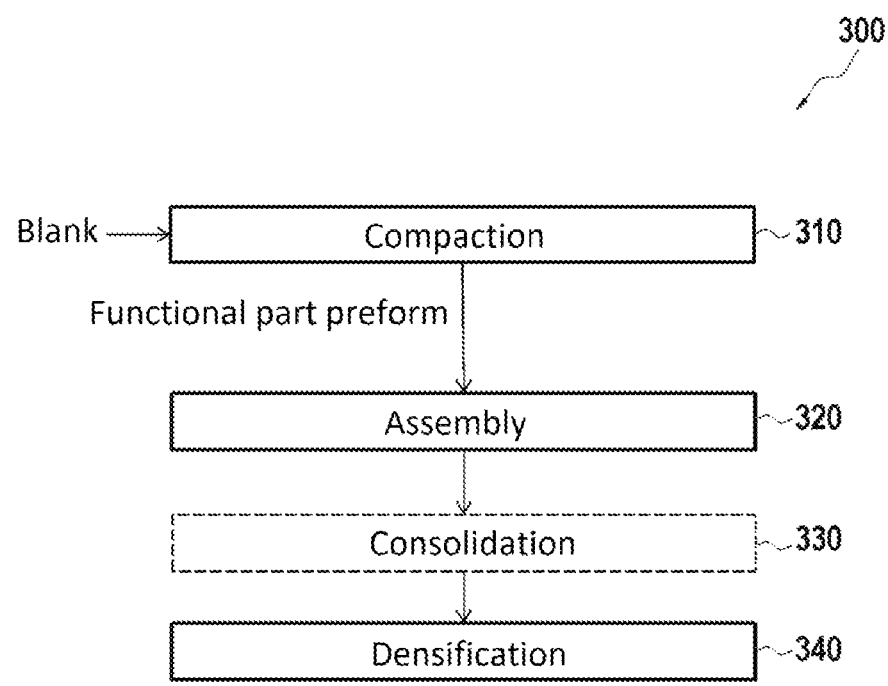

METHOD FOR MANUFACTURING A CERAMIC MATRIX COMPOSITE PART

CROSS-REFERENCE TO RELATED APPLICATIONS

This application is the U.S. National Stage of PCT/FR2021/052236, filed Dec. 8, 2021, which in turn claims priority to French patent application number 20 13613 filed Dec. 18, 2020. The content of these applications are incorporated herein by reference in their entireties.

TECHNICAL FIELD

The present invention relates to the general field of the design of ceramic matrix composite (CMC) materials, and more particularly to the design of a CMC composite material component incorporating both a structural part and a functional part, distinct from the structural part.

PRIOR ART

CMC material components can be produced using woven textile preforms based on continuous long fibres. However, the weaving can be complicated to carry out for the functional parts of the component, which can have a complex shape.

It is therefore desirable to have a method for manufacturing a functionalised CMC material component having the desired structural behaviour which is relatively simple to implement.

DISCLOSURE OF THE INVENTION

The invention relates to a method for manufacturing a ceramic matrix composite component comprising at least a structural part and a functional part secured to the structural part, the method comprising:
  obtaining an assembly comprising a first preform of the functional part that is mounted on a second preform of the structural part or on the structural part, the first preform comprising a fibrous reinforcement of short fibres, and the second preform or the structural part comprising a woven fibrous reinforcement, and
  densification of at least the first preform of the assembly by infiltration with a molten composition.

The structural part gives the component the desired structural behaviour, whereas the functional part is a part with little thermomechanical stress, which can ensure a non-structural function such as a sealing or anti-tilting function. The use of a woven fibrous reinforcement guarantees the desired mechanical strength for the structural part and the use of short fibres eliminates a weaving step for manufacturing the functional part and associated limitations in terms of achievable geometry. The manufacture of a CMC material component is thus simplified, due to the dissociation between the functions and geometric singularities, and the structure of the component.

The manufacturing method of the invention can also be used as a repair method in order to manufacture a repaired component.

According to a particular feature of the invention, the first preform is mounted on the second preform and there is a co-densification of the first and second preforms by the molten composition.

The co-densification can bond the two preforms together by infiltration of the molten composition into the two preforms and also makes it possible to form a common matrix for the structural and functional parts.

According to another particular feature of the invention, the first preform is mounted on the structural part and the molten composition solders the functional part to the structural part.

In this last case, the first preform is mounted on the structural part which is made of CMC material and already densified. The densification of the preform of the functional part directly on the structural part can densify the preform and solder this functional part to the structural part through the molten composition. The functional part is thus bonded to the structural part in the obtained component. This makes it possible, in particular, to repair and replace a functional part of a CMC material component. A defect, such as a damaged area of a functional part of the component, can thus be repaired by adding a new portion on the damaged functional part to replace the defect, or by replacing the entire damaged functional part by a new functional part. Depending on its nature, size and location, it is also possible to repair a defect present in a structural part by soldering the first preform on or to the site of the defect of the structural part.

According to an embodiment of the invention, the method further comprises forming the first preform, this forming comprising forming a first blank comprising the fibrous reinforcement of short fibres present in a binder, debonding the first blank and optionally compacting the first debonded blank so as to obtain the first preform.

The binder can bond the short fibres together, as well as any other fillers present. The effect is to reduce the friable nature of the blank before its debonding. This makes it possible to handle the blank more easily in order, for example, to introduce it into a mould.

According to a particular feature of the invention, the first blank further comprises first additional fillers present in the binder and distinct from the short fibres of the reinforcement, the first additional fillers having a metallic or ceramic surface.

According to another particular feature of the invention, the first preform is mounted on the second preform and obtaining the assembly comprises forming a second blank comprising the woven fibrous reinforcement, so as to obtain the second preform.

According to another particular feature of the invention, the second blank further comprises second additional fillers having a metal or ceramic surface.

According to another particular feature of the invention, consolidation of the first preform is carried out by sintering first additional fillers before the densification.

According to another particular feature of the invention, a consolidation of the second preform is carried out by sintering second additional fillers before the densification.

The sintering of the first and/or second additional fillers in the preforms reduces the volume ratio of pores in the preforms so that the preforms have a better behaviour, in particular during the densification. It can also reduce the degree of free silicon in the final component, because the porosity to be filled is lower.

According to another particular feature of the invention, the functional part is at least one of a sealing part or an anti-tilting part of the component.

The functional part can also be a repair portion of a functional or structural part, for example in the form of a patch.

Alternatively, the functional part can also be an aerodynamic over-profile.

More precisely, in the case of an aerodynamic overprofile, the massive central part of the blade can be a structural preform and the aerodynamic profile with complex shape can be obtained by adding a functional part around the structural preform with simple shape. In the case of a repair method, this makes it possible to easily reform and/or repair the complex aerodynamic profile after several thousand hours of flight.

According to another particular feature of the invention, the component is a turbomachine component.

According to another particular feature of the invention, the component is a turbomachine blade.

BRIEF DESCRIPTION OF THE FIGURES

Other features and advantages of the present invention will become apparent from the description given below, with reference to the appended drawings which illustrate exemplary embodiments that are in no way limiting.

FIG. 1 shows, schematically and partially, a ceramic matrix composite component according to an embodiment of the invention.

FIG. 2 shows, schematically and partially, a method for manufacturing a CMC material component according to an embodiment of the invention.

FIG. 3 shows, schematically and partially, a method for manufacturing a CMC material component according to an embodiment of the invention.

DESCRIPTION OF THE EMBODIMENTS

FIG. 1 shows, schematically and partially, a ceramic matrix composite (CMC) component 100 according to an embodiment of the invention.

In this exemplary embodiment, the component 100 made of CMC material is a turbomachine blade comprising a structural part 110 and a functional part 120.

In the illustrated example, the structural part 110 comprises, in particular, an aerofoil part 114 defining the aerodynamic profile and comprising a pressure face and a suction face, an upper platform 111 and a lower platform 113 which define the vane of the blade 100, and a blade root 112. According to the invention, the structural part 110 comprises a woven fibrous reinforcement, in other words it is made of a CMC material comprising a fibrous reinforcement consisting of continuous fibres and densified by a ceramic matrix. The fibrous reinforcement can be obtained by three-dimensional weaving, for example with an interlocking weave.

The functional part 120 is a non-structural part and is intended to ensure a different function from the structural function. In this exemplary embodiment, the functional part 120 comprises three functional portions: a downstream wall 121, an upstream wall 122 and the root platform 123. According to the invention, these portions of the functional part are made of CMC material comprising a fibrous reinforcement consisting of short fibres and densified by a ceramic matrix.

The role of the walls 121 and 122 is to ensure axial sealing. The role of the root platform 123 is to close the cavity in which the blade root 112 is located, in order to create a pressure chamber. This platform 123 can also prevent the tilting of the root 112.

The functional portions 121, 122 and 123 are secured to the structural part 110.

FIG. 2 shows a method 200 for manufacturing a CMC material component according to an embodiment of the invention.

The final component made of CMC material comprises at least one functional part secured to a structural part. The method 200 comprises, first, obtaining an assembly 210. The assembly comprises a first preform of the functional part mounted on either a second preform of the non-densified or incompletely densified structural part, or the already densified structural part made of CMC material.

The first preform comprises a fibrous reinforcement of short fibres, while the second preform or the structural part comprises a woven fibrous reinforcement. More particularly, the structural part comprises a woven fibrous reinforcement densified by a ceramic matrix.

The method 200 then comprises the densification 220 of the first preform of the assembly. The densification 220 is made by infiltrating the first preform with a molten composition comprising, for example, silicon (melt infiltration technique). The densification 220 enables a ceramic matrix to be formed in the first preform and the first preform to be bonded to the second preform or to the structural part.

If, when obtaining the assembly 210, the first preform is mounted on the second preform, it is also possible to co-densify the first and second preforms with the molten composition during the densification step 220. This makes it possible to also form a ceramic matrix in the second preform while bonding the two preforms to one another. A common ceramic matrix is thus formed, densifying the first preform and the second preform. The continuity of the matrix between the two preforms is improved and this makes it possible to reduce design singularities, in particular the areas of weakness of the final component.

FIG. 3 shows a method 300 for manufacturing a CMC material component according to another embodiment of the invention.

The final component made of CMC material always comprises a functional part secured to a structural part.

The method 300 comprises, first, the compacting 310 of a first blank. The first blank can be formed from a fibrous reinforcement of short fibres present in a binder that is debonded before carrying out the compaction 310. The compaction 310 of the debonded first blank makes it possible to obtain a first preform of the functional part. The binder can reduce the friable nature of the blank and makes it possible to handle the blank more easily before the debonding for compaction 310.

The compaction 310 can result in a reduction of at least 10% of at least one dimension of the blank.

The compaction 310 can be a hot isostatic compaction, or a cold isostatic compaction or even a spark plasma sintering.

Then, this first preform is placed on a second preform of the structural part or on the structural part of the component, so as to obtain an assembly 320. As previously indicated, the second preform or the structural part comprises a woven fibrous reinforcement, and more particularly the structural part comprises a woven fibrous reinforcement densified by a ceramic matrix.

Finally, the first preform 340 is densified by infiltration of the first preform by a molten composition. This densification 340 can form a ceramic matrix in the first preform and bond the first preform to the structural part or to the second preform.

As previously, if the first preform is mounted on a second preform of the structural part and not directly on the structural part, the two preforms can be co-densified during the densification 340. This makes it possible to form a common ceramic matrix in the first and second preforms.

Moreover, the first blank can also comprise additional fillers in the binder, distinct from the short fibres, and having a metallic or ceramic surface. Through these additional fillers, it is possible to consolidate the first preform before the densification by the molten composition. The consolidation 330 of the first preform is optional and can be carried out between obtaining the assembly 320 and the densification 340, or before positioning the first preform on the second preform or on the structural part so as to form the assembly. The consolidation 330 can be carried out by sintering the first additional fillers. It is within the general knowledge of a person skilled in the art to determine the operating conditions of temperature and duration of sintering according to the materials used. It enables the friability of the first preform to be improved and the mechanical strength to be increased.

Furthermore, the second preform can be obtained from a formed second blank comprising the woven fibrous reinforcement.

The second blank can also comprise second additional fillers having a metal or ceramic surface. Thus, as for the first preform, it is possible to consolidate the second preform. This optional consolidation of the second preform can be carried out at the same time as the consolidation 330 of the first preform or before the positioning of the first preform. It can also be carried out by sintering the second additional fillers. It thus enables the friability of the second preform to be reduced and mechanical strength of the assembly of the two preforms to be increased.

It is also possible to separately densify the first and second blanks of the two preforms, and then to solder them together in order to form the assembly.

Whatever the embodiment of the method, the short fibres can have a length between 50 µm and 5000 µm, for example between 50 µm and 1000 µm, for example between 100 µm and 500 µm, for example substantially 250 µm. Unless otherwise stated, an "average" dimension shall mean the dimension given by the statistical particle size distribution at half the population, referred to as $d_{50}$.

Moreover, these short fibres can be silicon carbide SiC fibres having an oxygen content less than or equal to 1% in atomic percent. These SiC fibres can, for example, be fibres supplied under the name "Hi-Nicalon-S" by Japanese company NGS.

Whatever the embodiment of the manufacturing method, the short fibres and/or long fibres comprised in the reinforcement of the second preform can be coated with an interphase layer, for example an interphase of boron nitride (BN) or pyrolytic carbon (PyC). This interphase layer can divert cracks of the ceramic matrix during use of the component. The interphase layer has, for example, a thickness of 500 nm. The interphase layer can also be coated with a protective layer, for example a layer of silicon carbide of several microns thickness. This protective layer can protect the interphase from potential chemical attacks of the molten composition during infiltration of the first preform, and possibly of the second preform.

Whatever the embodiment of the manufacturing method, the additional fillers can be particles of silicon carbide or of metal disilicides. They participate in the formation of the matrix during the densification.

The additional fillers of the first preform of the functional part can be coated with a metal layer. The metal layer can have a thickness between 100 nm and 5000 nm, for example between 500 nm and 1500 nm.

Whatever the embodiment of the manufacturing method, the molten composition can correspond to molten silicon alone or a silicon alloy in the molten state, which also contains one or more other elements such as titanium, molybdenum, boron, iron or niobium. The mass content of silicon in the molten composition can be greater than or equal to 50%, or even 90%. The molten composition can also be a fusible alloy that is thermochemically compatible with the fillers and the fibrous reinforcements used in the preforms and blanks. The molten composition can also be metal disilicides, such as titanium disilicide $TiSi_2$ or molybdenum disilicide $MoSi_2$.

Whatever the embodiment of the manufacturing method, the first preform and/or the second preform can also be silicided beforehand, before their assembly so as to fill only part of their porosity. This preliminary silicidation can, in particular, combine materials of different composition in order to give the final component, for example, thermomechanical property gradients, for example thermal coefficient gradients, in order to promote integration of the final component.

Whatever the embodiment of the manufacturing method, the binders used to produce the blank of the first preform can comprise at least one thermoplastic polymer. For example, the binder can comprise at least one compound chosen from polyvinyl alcohol (PVA), polyethylene glycol (PEG), polypropylene (PP), polyoxymethylene (POM) or polyethylene terephthalate (PET).

The binders can also comprise at least one thermosetting polymer. For example, they can comprise at least one compound chosen from epoxy resins, phenolic resins or pre-ceramic resins.

Whatever the embodiment of the manufacturing method, in the first blank, before debonding, the content by volume of binder can be between 15% and 55%, the content by volume of fillers (in other words short fibres and additional fillers) can be between 45% and 85%. Among the fillers, the short fibres can have a content by volume between 10% and 35%, for example between 15% and 25% and the additional fillers represent the complement of the short fibres. After infiltration by the molten composition, the residual porosity of the final component is less than or equal to 15%.

The expression "between . . . and . . . " should be understood as including the limits.

The invention claimed is:

1. A method for manufacturing a turbomachine blade made of ceramic matrix composite material, comprising at least a structural part and a functional part secured to the structural part, the functional part comprising three functional portions: a downstream wall, an upstream wall and a root platform of the blade and the structural part comprising a lower platform distinct from the root platform and the method comprising:
   obtaining an assembly comprising a first preform of the functional part that is mounted on a second preform of the structural part or on the structural part, the first preform comprising a fibrous reinforcement of short fibres having a length between 50 µm and 5000 µm, and the second preform or the structural part comprising a woven fibrous reinforcement, and
   densification of at least the first preform of the assembly by infiltration with a molten composition.

2. The manufacturing method according to claim 1, wherein the first preform is mounted on the second preform and wherein there is a co-densification of the first and second preforms by the molten composition.

3. The manufacturing method according to claim 1, wherein the first preform is mounted on the structural part and wherein the molten composition solders the functional part to the structural part.

4. The manufacturing method according to claim 1, wherein obtaining the assembly further comprises forming the first preform, said forming comprising of forming a first blank comprising the fibrous reinforcement of short fibres present in a binder, debonding the first blank and compacting the first debonded blank so as to obtain the first preform.

5. The manufacturing method according to claim 4, wherein the first blank further comprises first additional fillers present in the binder and distinct from the short fibres of the reinforcement, the first additional fillers having a metallic or ceramic surface.

6. The manufacturing method according to claim 5, wherein a consolidation of the first preform is carried out by sintering the first additional fillers before the densification.

7. The manufacturing method according to claim 1, wherein the first preform is mounted on the second preform and obtaining the assembly comprises forming a second blank comprising the woven fibrous reinforcement, so as to obtain the second preform.

8. The manufacturing method according to claim 7, wherein the second blank further comprises second additional fillers having a metal or ceramic surface.

9. The manufacturing method according to claim 8, wherein a consolidation of the second preform is carried out by sintering the second additional fillers before densification.

10. The manufacturing method according to claim 1, wherein the root platform closes a cavity in which a blade root is located and creates a pressure chamber.

11. The manufacturing method according to claim 1, wherein the root platform is located radially inside with respect to the lower platform.

* * * * *